United States Patent
Mizrachi et al.

(10) Patent No.: US 9,128,748 B2
(45) Date of Patent: Sep. 8, 2015

(54) PARALLEL SIMULATION USING MULTIPLE CO-SIMULATORS

(75) Inventors: Shay Mizrachi, Hod-Hasharon (IL); Uri Tal, Netanya (IL); Tomer Ben-David, Yavne (IL); Ishay Geller, Mikhmoret (IL); Ido Kasher, Tel Aviv (IL)

(73) Assignee: ROCKETICK TECHNOLOGIES LTD., Ramat Gan (IL)

( * ) Notice: Subject to any disclaimer, the term of this patent is extended or adjusted under 35 U.S.C. 154(b) by 17 days.

(21) Appl. No.: 13/084,574

(22) Filed: Apr. 12, 2011

(65) Prior Publication Data

US 2011/0191092 A1  Aug. 4, 2011

(51) Int. Cl.
*G06F 17/50* (2006.01)
*G06F 9/46* (2006.01)

(52) U.S. Cl.
CPC . *G06F 9/46* (2013.01); *G06F 17/50* (2013.01)

(58) Field of Classification Search
CPC ............ G06F 17/5022; G06F 17/5027; G06F 2217/86; G06F 17/5009; G06F 9/3851; G06F 9/3885; G06F 9/3887; G06F 9/03145; G06F 15/8007; G06F 9/3834; G06F 9/3889; G06F 9/5077
USPC .................. 703/13, 16, 14, 17; 716/111, 113
See application file for complete search history.

(56) References Cited

U.S. PATENT DOCUMENTS

| | | | |
|---|---|---|---|
| 3,725,864 A | 4/1973 | Clark et al. | |
| 3,812,475 A | 5/1974 | Christiansen et al. | |
| 4,325,120 A | 4/1982 | Colley et al. | |
| 4,658,351 A | 4/1987 | Teng | |
| 4,805,107 A | 2/1989 | Kieckhafer et al. | |
| 6,144,932 A | 11/2000 | Hachiya | |
| 7,353,157 B2 | 4/2008 | Wasynczuk et al. | |
| 7,409,656 B1 | 8/2008 | Ruehl | |
| 7,444,276 B2 | 10/2008 | Watt et al. | |
| 7,509,244 B1 | 3/2009 | Shakeri et al. | |
| 7,856,347 B2 * | 12/2010 | Rich et al. | 703/17 |
| 8,108,633 B2 | 1/2012 | Munshi et al. | |
| 2002/0049956 A1 * | 4/2002 | Bozkus et al. | 716/4 |
| 2005/0091025 A1 | 4/2005 | Wilson et al. | |
| 2005/0125793 A1 | 6/2005 | Aguilar et al. | |
| 2006/0130012 A1 | 6/2006 | Hatano et al. | |
| 2006/0242618 A1 | 10/2006 | Wang et al. | |
| 2007/0038987 A1 | 2/2007 | Ohara et al. | |

(Continued)

FOREIGN PATENT DOCUMENTS

JP    08287022 A    11/1996
JP    2004206314 A    7/2004

(Continued)

OTHER PUBLICATIONS

Flowmaster Flowmaster Announcements 2008.*

(Continued)

*Primary Examiner* — Omar Fernandez Rivas
*Assistant Examiner* — Cuong Luu
(74) *Attorney, Agent, or Firm* — D. Kligler I.P. Services Ltd.

(57) ABSTRACT

A method includes accepting a simulation task for simulation by a simulator that controls multiple co-simulators. Each of the multiple co-simulators is assigned to execute one or more respective sub-tasks of the simulation task. The simulation task is executed by invoking each co-simulator to execute the respective assigned sub-tasks.

23 Claims, 2 Drawing Sheets

(56) References Cited

U.S. PATENT DOCUMENTS

| | | | |
|---|---|---|---|
| 2007/0073528 | A1 | 3/2007 | Watt et al. |
| 2007/0073999 | A1 | 3/2007 | Verheyen et al. |
| 2007/0074000 | A1 | 3/2007 | Colwill et al. |
| 2007/0129924 | A1 | 6/2007 | Verheyen et al. |
| 2007/0129926 | A1 | 6/2007 | Verheyen et al. |
| 2007/0150702 | A1 | 6/2007 | Verheyen et al. |
| 2007/0206611 | A1 | 9/2007 | Shokri et al. |
| 2007/0219771 | A1 | 9/2007 | Verheyen et al. |
| 2007/0250800 | A1 | 10/2007 | Keswick |
| 2008/0114937 | A1 | 5/2008 | Reid et al. |
| 2008/0140998 | A1 | 6/2008 | Kissell |
| 2008/0208553 | A1 | 8/2008 | Borah et al. |
| 2008/0276064 | A1 | 11/2008 | Munshi et al. |
| 2009/0150136 | A1* | 6/2009 | Yang .............................. 703/13 |
| 2010/0274549 | A1* | 10/2010 | Tal et al. ......................... 703/17 |
| 2010/0332202 | A1* | 12/2010 | Nakhla et al. .................... 703/2 |
| 2011/0067016 | A1* | 3/2011 | Mizrachi et al. .............. 717/149 |
| 2011/0184713 | A1* | 7/2011 | Yang .............................. 703/13 |

FOREIGN PATENT DOCUMENTS

| | | | |
|---|---|---|---|
| JP | 2006259821 | A | 9/2006 |
| JP | 2007048052 | A | 2/2007 |
| WO | 0042535 | A1 | 7/2000 |
| WO | 0201346 | A2 | 1/2001 |
| WO | 0135283 | A2 | 5/2001 |
| WO | 2006117683 | A2 | 11/2006 |

OTHER PUBLICATIONS

Ezudheen P. et al. Parallel SystemC Kernel for Fast Hardware Simulation on SMP Machines ACM/IEEE/SCS 23rd Workshop on Principles of Advanced and Distributed Simulation, 1087-4097/09, pp. 80-87 IEEE 2009.*

Tun Li, Yang Guo, Si-Kun Li Design and Implementation of a Parallel Verilog Simulator: PVSim Proceedings of the 17th International Conference on VLSI Design (VLSID'04) 1063-9667/04, IEEE 2004.*

Mahesh Nanjundappa Accelerating Hardware Simulation on Multicores Virginia Polytechnic Institute and State University, May 4, 2010.*

Antonio Todesco, Teresa Meng Symphony: Simulation Backplane for Parallel Mixed-Mode Co-Simulation of VLSI Systems 33rd Design Automation Conference, 1996.*

Todesco et al. Symphny: A Simulation Backplane for Parallel Mixed-Mode CO-Simulation of WLSI Systems DAC, 1996.*

Cadambi et al., "A Fast, Inexpensive and Scalable Hardware Acceleration Technique for Functional Simulation", Proceedings of the 39th IEEE ACM Design Automation Conference (DAC 2002), pp. 570-575, New Orleans, USA, Jun. 10-14, 2002.

Karypis et al., "Multilevel Hypergraph Partitioning: Applications in VLSI Domain", IEEE Transactions on Very Large Scale Integration (VLSI) Systems, vol. 7, No. 1, pp. 69-79, USA, Mar. 1999.

NVIDIA Corporation, "Technical Brief, NVIDIA GeForce® GTX 200 GPU Architectural Overview, Second-Generation Unified GPU Architecture for Visual Computing", May, 2008.

Gigabyte Technology Co., Ltd., "NVIDIA® GeForceTM GTX 285 Graphics Accelerator", User's Manual, 2009.

International Application PCT/IL09/00330 Search Report dated Jul. 14, 2009.

International Application PCT/IB09/52820 Search Report dated Jan. 14, 2010.

Rubinstein, M., "Discrete Approaches to Content-Aware Image and Video Retargeting", M.Sc. Dissertation, The Interdisciplinary Center, Efi Arazi School of Computer Science, Herzliya, Israel, May 21, 2009.

Cadambi et al., "SimPLE: An Inexpensive, Scalable & Fast Hardware Acceleration Technique for Functional Simulation", C&C Research Laboratories, USA, Jun. 18, 2002.

IEEE Standard 1364-2001, "IEEE Standard Verilog® Hardware Description Language", Sep. 28, 2001.

IEEE Standard 1800-2009, "IEEE Standard for System Verilog—Unified Hardware Design, Specification, and Verification Language", Dec. 11, 2009.

Japanese patent application No. 2011-517279 Office Action dated Oct. 30, 2013.

European Patent Application # 09724182 Extended Search Report dated Jun. 19, 2013.

U.S. Appl. No. 12/810,310 Office Action dated Jun. 11, 2013.

Narayanan et al.,"Fault simulation on massively parallel SIMD machines algorithms, implementations and results", Journal of Electronic Testing, vol. 3, No. 1, pp. 79-92, Feb. 1, 1992.

Willis et al., "Use of embedded scheduling to compile VHDL for effective parallel simulation", Proceedings of European Design Automation Conference, Brighton, UK, pp. 400-405, Sep. 18-22, 1995.

Perinkulam, A.S., "Logic simulation using graphics processors", Master Thesis, University of Massachusetts, pp. 1-52, Sep. 1, 2007.

Mizrachi et., U.S. Appl. No. 13/907,922 dated Jun. 2, 2013.

Ottoni et al., "Automatic Thread Extraction with Decoupled Software Pipelining", 38th Annual IEEE/ACM International Symposium on Microarchitecture (MICRO-38), pp. 105-116, Barcelona, Spain, Nov. 12-16, 2005.

Ottoni et al., "Global Multi-Threaded Instruction Scheduling", 40th Annual IEEE/ACM International Symposium on Microarchitecture (MICRO-2007), pp. 56-67, Chicago, USA, Dec. 1-5, 2007.

Garland et al., "Parallel Computing Experiences with CUDA", IEEE Micro, vol. 28, No. 4, pp. 13-27, Jul. 1, 2008.

Ryoo et al., "Optimization Principles and Application Performance Evaluation of a Multithreaded GPU using CUDA", Proceedings of the 13th ACM SIGPLAN Symposium on Principles and Practice of Parallel Programming (PPoPP'08), pp. 73-82, Salt Lake City, USA, Feb. 20-23, 2008.

European Patent Application # 09794083.7 Extended Search Report dated Nov. 13, 2012.

Chinese Patent Application # 200980126852.2 Office Action dated Aug. 29, 2012.

U.S. Appl. No. 13/907,922 Notice of Allowance dated Jan. 20, 2015.

Flowmaster. Flowmaster Announcements. 2008.†

\* cited by examiner
† cited by third party

PARALLEL SIMULATION USING MULTIPLE CO-SIMULATORS

FIELD OF THE INVENTION

The present invention relates generally to simulation systems, and particularly to methods and systems for simulation using co-simulators.

BACKGROUND OF THE INVENTION

Computerized simulation techniques are used for analyzing and solving complex computational problems in various fields, such as verifying the performance of complex electronic hardware designs. Many simulation techniques are known in the art. Some techniques use parallel processing in order to reduce simulation time.

For example, PCT International Publication WO 2009/118731, whose disclosure is incorporated herein by reference, describes a method for design simulation that includes partitioning a verification task of a design into a first plurality of atomic Processing Elements (PE) having execution dependencies. The method further includes computing an order for executing the PEs on a multiprocessor device, which includes a second plurality of processors operating in parallel and schedules the PEs for execution by the processors according to a built-in scheduling policy. The order induces concurrent execution of the PEs by different ones of the processors without violating the execution dependencies, irrespective of the scheduling policy. The PEs are executed on the processors in accordance with the computed order and the scheduling policy, to produce a simulation result. A performance of the design is verified responsively to the simulation result.

As another example, PCT International Publication WO 2010/004474, whose disclosure is incorporated herein by reference, describes a computing method that includes accepting a definition of a computing task, which includes multiple atomic Processing Elements (PEs) having execution dependencies. The computing task is compiled for concurrent execution on a multiprocessor device, which includes multiple processors that are capable of executing a first number of the PEs simultaneously, by arranging the PEs, without violating the execution dependencies, in an invocation data structure including a second number of execution sequences that is greater than one but does not exceed the first number. The multiprocessor device is invoked to run software code that executes the execution sequences in parallel responsively to the invocation data structure, so as to produce a result of the computing task.

SUMMARY OF THE INVENTION

An embodiment that is described hereinbelow provides a method, which includes accepting a simulation task for simulation by a simulator that controls multiple co-simulators. Each of the multiple co-simulators is assigned to execute one or more respective sub-tasks of the simulation task. The simulation task is executed by invoking each co-simulator to execute the respective assigned sub-tasks.

In some embodiments, the simulation task is defined at any given time by a simulation state that is maintained by the simulator, and each sub-task is defined at any given time by a respective co-simulation state that is maintained independently of the simulator by the co-simulator assigned to execute the sub-task.

In some embodiments, executing the simulation task includes executing a given sub-task, which includes a value assignment statement, by a given co-simulator, returning a result of the value assignment statement from the given co-simulator to the simulator before execution of any non-blocking assignment if the value assignment statement is a blocking assignment, and returning the result after executing all blocking assignments if the value assignment statement is a non-blocking assignment. In an embodiment, returning the result includes scheduling the simulator to call the given co-simulator at a postponed time in order to accept the result of the value assignment statement.

In some embodiments, the method includes returning control of the simulation task from a given co-simulator to the simulator before completing execution of a given sub-task executed by the given co-simulator, in order to enable at least one other co-simulator to operate concurrently with the given co-simulator. Returning the control may include scheduling the simulator to call the given co-simulator at a postponed time in order to accept a result of the given sub-task.

In a disclosed embodiment, executing the simulation task includes executing at least one sub-task of the simulation task by the simulator. Executing the at least one sub-task may include synchronizing two or more sub-tasks, which are executed by two or more respective co-simulators, using the at least one sub-task executed by the simulator.

In some embodiments, the method includes representing the simulation task as a hierarchical tree structure, and partitioning the simulation task into the sub-tasks by recursively traversing the hierarchical tree structure. The method may include compiling the sub-tasks using one or more compilers. In an embodiment, compiling the sub-tasks includes compiling two or more of the sub-tasks using two or more respective, separate compilers.

In a disclosed embodiment, accepting the simulation task includes accepting a definition of a hardware design, and executing the simulation task comprises verifying the hardware design. The method may include executing at least part of given sub-task in a given co-simulator using a Graphics Processing Unit (GPU).

There is additionally provided, in accordance with an embodiment of the present invention, a method that includes invoking a co-simulator by a simulator to execute a sub-task of a simulation task, wherein the sub-task includes at least a value assignment statement. If the value assignment statement is a blocking assignment, a result of the of the value assignment statement is returned from the co-simulator to the simulator before execution of any non-blocking assignment. If the value assignment statement is a non-blocking assignment, the result is returned after executing all blocking assignments. The simulation task is executed by the simulator using the result of the sub-task.

There is also provided, in accordance with an embodiment of the present invention, a system that includes a simulator and multiple co-simulators. The simulator is configured to accept a simulation task, to assign each of the multiple co-simulators to execute one or more respective sub-tasks of the simulation task, and to execute the simulation task by invoking each co-simulator to execute the respective assigned sub-tasks.

There is further provided, in accordance with an embodiment of the present invention, a system that includes a simulator and a co-simulator. The co-simulator is configured to accept and execute a sub-task of a simulation task, wherein the sub-task includes at least a value assignment statement, to return a result of the of the value assignment statement before execution of any non-blocking assignment if the value assignment statement is a blocking assignment, and to return the result after executing all blocking assignments if the value assignment statement is a non-blocking assignment. The simulator is configured to invoke the co-simulator to execute the sub-task, and to execute the simulation task using a result of the sub-task returned from the co-simulator.

There is also provided, in accordance with an embodiment of the present invention, a computer software product. The product includes a tangible non-transitory computer-readable medium, in which program instructions are stored, which instructions, when read by a computer, cause the computer to accept a simulation task, to assign each of multiple co-simulators to execute one or more respective sub-tasks of the simulation task, and to execute the simulation task by invoking each co-simulator to execute the respective assigned sub-tasks.

There is additionally provided, in accordance with an embodiment of the present invention, a computer software product. The product includes a tangible non-transitory computer-readable medium, in which program instructions are stored, which instructions, when read by a computer, cause the computer to accept and execute a sub-task of a simulation task, wherein the sub-task includes at least a value assignment statement, to return a result of the of the value assignment statement before execution of any non-blocking assignment if the value assignment statement is a blocking assignment, and to return the result after executing all blocking assignments if the value assignment statement is a non-blocking assignment.

The present invention will be more fully understood from the following detailed description of the embodiments thereof, taken together with the drawings in which:

DETAILED DESCRIPTION OF EMBODIMENTS

Overview

Embodiments of the present invention that are described hereinbelow provide improved methods and systems for executing simulation tasks. Applications of the disclosed techniques may comprise, for example, verification of Very Large Scale Integration (VLSI), analog or control hardware designs. Other applications may be in the field of search engines.

In some embodiments, a simulation system comprises a simulator that controls multiple co-simulators. In order to execute a certain simulation task, each co-simulator is assigned to execute one or more sub-tasks of the simulation task. The simulator executes the simulation task by invoking each co-simulator to execute its assigned sub-task(s), as well as synchronizing and coordinating the operation of the multiple co-simulators.

Unlike some known parallel simulation schemes in which a simulation task is executed by multiple parallel processors, in the disclosed techniques each sub-task is defined by a respective state, and this state is maintained by the executing co-simulator independently of the simulator. Some disclosed embodiments provide interfaces and interaction mechanisms between the simulator and the co-simulators, which achieve data synchronization and concurrent execution across the system. An example process of partitioning a simulation task into a well-balanced set of sub-tasks is also described. The partitioning into multiple sub-tasks lends itself to parallel compilation. In some embodiments, different sub-tasks may be compiled by different, possibly parallel, compilers.

The use of multiple co-simulators provides considerable advantages. For example, the disclosed simulation systems are able to carry out large simulation tasks, which are beyond the memory and computational complexity capabilities of a single simulator or simulator/co-simulator pair. Moreover, partitioning a simulation task among multiple parallel co-simulators enables substantial reduction in simulation time. Since each co-simulator maintains the states of its sub-tasks independently, the disclosed schemes provide true offloading of the simulator and are therefore highly scalable.

System Description

Figure 1:
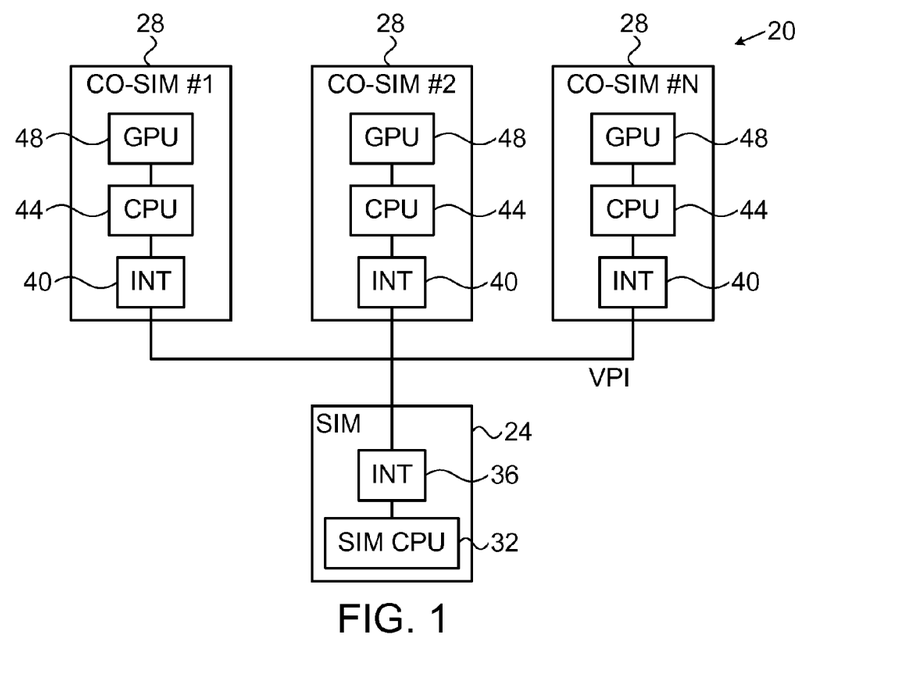
FIG. 1 is a block diagram that schematically illustrates a simulation system, in accordance with an embodiment of the present invention.

FIG. 1 is a block diagram that schematically illustrates a simulation system 20, in accordance with an embodiment of the present invention. In the embodiments described herein, system 20 is used for verifying electronic hardware designs. In alternative embodiments, however, system 20 can be used to perform any other suitable simulation task, such as searching using multiple concurrent search engines.

System 20 comprises a simulator 24 and one or more co-simulators 28. In the present example the system comprises N co-simulators denoted #1 . . . #N. Although the embodiments described herein refer mainly to configurations comprising multiple co-simulators, the disclosed techniques are similarly applicable to configurations having only a single co-simulator.

Simulator 24 is provided with a simulation task to be performed, e.g., a hardware design to be verified. In an example embodiment, the hardware design is represented using Verilog. Alternatively, the design may be represented using any other suitable Hardware Description Language (HDL), such as VHDL, or other Register Transfer Level (RTL) abstraction.

Simulator 24 is configured to run the simulation task, which is partitioned into sub-tasks that are to be executed by the simulator and by co-simulators 28. This kind of execution typically involves a preparatory processing stage in which the simulation task is partitioned into the sub-tasks, as will be described below.

Typically, each sub-task comprises a shared object having a respective database. After partitioning, the simulator provides at least some of the sub-tasks to the co-simulators, and operates the co-simulators to execute their designated sub-tasks. Note that some sub-tasks may be executed internally in the simulator and not delegated to the co-simulators. For example, test-bench sub-tasks (i.e., simulation control) and sub-tasks that synchronize the co-simulators are typically performed by the simulator. (Note that test-bench tasks may be executed by the co-simulators.) In some embodiments, the simulation task is partitioned by another processor or system, and then provided to simulator 24 in partitioned form.

In the context of the present patent application and in the claims, the term "co-simulator" refers to a processing unit that carries out a part of the simulation task having a respective internal state. Such internal states are not fully available to the simulator, which is only aware of the overall state that defines the overall simulation task. In other words, the co-simulators are stateful processing units, each maintaining the internal state of its designated part of the simulation task independently of the simulator. The simulator may synchronize and control the different co-simulators, but it is typically aware only of the overall state of the simulation and unaware of the internal states of the co-simulators.

This definition of co-simulator is in contrast to some known parallel processing schemes in which a simulation task is partitioned into parallel tasks for execution by multiple parallel stateless processors or processing cores. Co-simulators 28 are sometimes referred to herein as accelerators, and the two terms are used interchangeably herein. Delegating a certain simulation sub-task to a co-simulator is sometimes referred to as accelerating that part of the simulation task.

In the example embodiment of FIG. 1, simulator 24 comprises a simulator Central Processing Unit (CPU) 32, which carries out the processing functions of the simulator, and an interface 36 that communicates with co-simulators 28. Each co-simulator 28 comprises an interface 40 for communicating with simulator 24, a co-simulator CPU 44 and a Graphics Processing Unit (GPU) 48. CPU 44 manages and controls the co-simulator operation. GPU 48 carries out at least part of the simulation sub-tasks assigned to the co-simulator. In some embodiments, CPU 44 may carry out part of the simulation sub-tasks assigned to the co-simulator. Certain aspects of carrying out simulation tasks using parallel processors, such as GPUs, are addressed in PCT International Publications WO 2009/118731 and WO 2010/004474, cited above.

The use of multiple co-simulators is advantageous for several reasons. For example, the size of the design that can be simulated is typically limited by the finite memory size of the co-simulator (e.g., GPU). Partitioning the design simulation task among multiple co-simulators enables the system to simulate large designs that are impossible to simulate with a single co-simulator. Moreover, the operating environment of the GPU (e.g., CUDA for NVIDIA GPUs) sometimes limits the memory size that is usable by a single simulation instance to less than the total memory size of the GPU. Proper partitioning into sub-tasks enables the system to exploit the entire memory space of the co-simulator. Furthermore, operating multiple co-simulators in parallel provides a considerable increase in simulation bandwidth and considerable reduction in simulation time.

The system configuration shown in FIG. 1 is an example configuration that is chosen purely for the sake of conceptual clarity. In alternative embodiments, system may have any other suitable configuration. For example, the system may comprise any suitable number of co-simulators. The simulation task may be partitioned into any suitable number of sub-tasks in any suitable manner. A given co-simulator 28 may comprise one or more processing units of any suitable type, not necessarily GPUs or other parallel processors. In some embodiments, the system may comprise multiple simulators 24 that run different, respective simulation tasks, or a single simulator that runs multiple simulation tasks. A given co-simulator may execute sub-tasks belonging to more than one simulation tasks.

Simulator 24 and co-simulators 28 may be implemented in hardware, in software, or using a combination of hardware and software elements. In one example embodiment, the entire system 20 is implemented in a single server platform, with each co-simulator implemented using a respective server blade. Alternatively, however, any other suitable configuration can be used. Typically, each of CPU 32, CPU 44 and GPU 48 may comprise a general-purpose processor that is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

In the present example, the simulation task comprises an electronic hardware design that is to be verified. The design is modeled using Verilog. Verilog is specified, for example, in IEEE standard 1364-2001, entitled "IEEE Standard Verilog Hardware Description Language," 2001, and in IEEE standard 1800-2009, entitled "IEEE Standard for System Verilog—Unified Hardware Design, Specification, and Verification Language," 2009, which are incorporated herein by reference. In this embodiment, simulator 24 and co-simulators 28 communicate using Verilog Procedural Interface (VPI). VPI is described in chapters 26-27 of the IEEE 1364-2001 standard, cited above. Alternatively, any other suitable interface or communication protocol, such as Programming Language Interface (PLI), can be used for communicating between simulator 24 and co-simulators 28. PLI is described in chapters 20-25 of the IEEE 1364-2001 standard, cited above. Other examples of interfaces are DirectC and Direct Kernel Interface.

Hierarchical Simulation Task Partitioning

Figure 2:
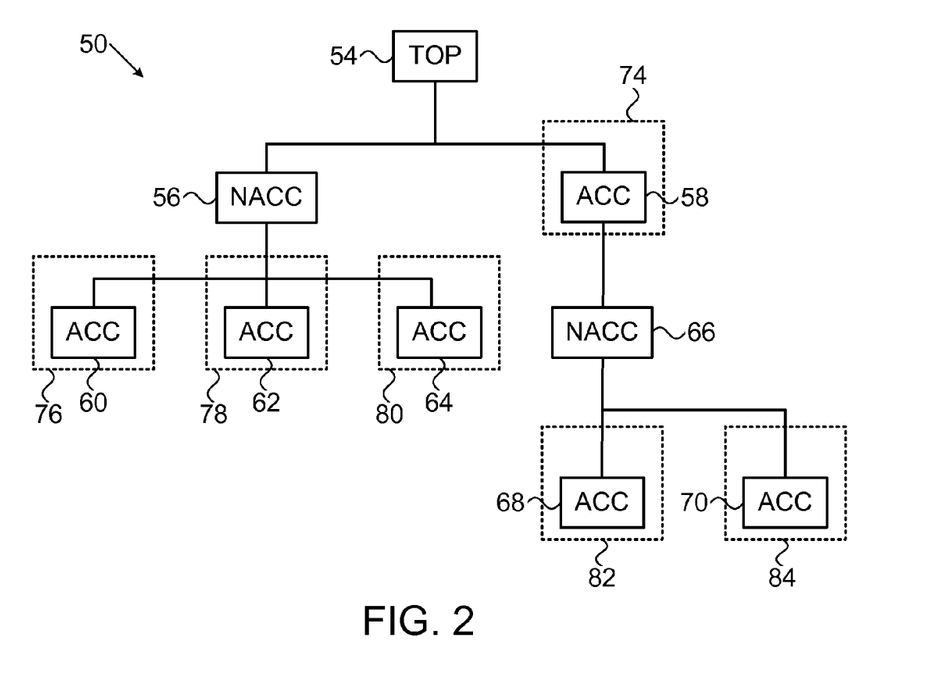
FIG. 2 is a diagram that schematically illustrates partitioning of a simulation problem, in accordance with an embodiment of the present invention.

FIG. 2 is a diagram that schematically illustrates partitioning of a simulation problem, in accordance with an embodiment of the present invention. In this example, the simulation task (e.g., design to be verified) is modeled as a hierarchical tree 50. Each node in the tree represents a (possibly empty) simulation sub-task. Each node communicates with its parent node and child node(s). Nodes that are marked "ACC" represent sub-tasks that are accelerated, i.e., delegated for execution by co-simulators 28. Nodes that are marked "NACC" are not accelerated, i.e., they are executed by simulator 24. A node 54 represents the top node of the simulation task. A given simulation task (e.g., a design) may have multiple top nodes.

In the present example, the simulation task is partitioned into three non-accelerated sub-tasks (represented by NACC nodes 56 and 66, as well as TOP node 54 that is also non-accelerated) and six accelerated sub-tasks (represented by ACC nodes 58, 60, 62, 64, 68 and 70). Dashed frames 74, 76, 78, 80, 82 and 84 represent partitions that are assigned for execution in respective different co-simulators. In this example each co-simulator executes the sub-task represented by a single accelerated node. Alternatively, however, a given co-simulator may execute multiple sub-tasks corresponding to multiple accelerated nodes.

Typically, the root of any sub-tree that comprises accelerated nodes is a non-accelerated node. For example, non-accelerated node 56 is the root of the sub-tree comprising accelerated nodes 60, 62 and 64. Non-accelerated node 66 is the root of the sub-tree comprising accelerated nodes 68 and 70. Non-accelerated node 54 is the root of the sub-tree comprising node 58. In other words, any two accelerated nodes (i.e., any two sub-tasks assigned to co-simulators) synchronize via a non-accelerated node (i.e., synchronize via the simulator). In some embodiments, communication between accelerated nodes is carried out by a non-accelerated node through which they synchronize. Alternatively, accelerated nodes may communicate directly with one another, even though they are synchronized by a non-accelerated node. Simulator 24 (or any other processor or system) may partition the simulation task into hierarchical structures of this sort in any suitable manner. An example partitioning method is described in detail further below.

Interaction Between Simulator and Co-Simulator(s)

In some embodiments, simulator 24 and co-simulators communicate using a mechanism that ensures synchronization and data integrity between the various signals and databases in the simulator and co-simulators. The following description refers to a system configuration in which the simulator and co-simulators communicate using VPI. The disclosed technique can be used, mutatis mutandis, with various other suitable interfaces or communication protocols.

Simulator 24 typically simulates a Verilog design in a sequence of simulation time slots. The processing of a given co-simulator 28 in a given time slot is divided into an ingress phase, an execution phase and an egress phase. In the ingress phase the co-simulator reads the values of one or more signals from the simulator. In the execution phase the co-simulator applies the appropriate processing to the signals. In the egress phase the co-simulator provides the processing results, e.g., updated values of the signals, back to the simulator.

In some embodiments, the co-simulator reads a given simulator signal by registering, or subscribing, to the signal and requesting the simulator to provide a trigger when the signal value changes. This feature is referred to as "callback on value change" in VPI terminology. The registration process may cause a value change on a given signal to trigger reading ("ingress processing") one or more other signals. Thus, a co-simulator need not necessarily register all ingress signals.

The processing performed by the co-simulator in the execution phase may comprise any suitable Verilog statements. In particular, the processing may comprise blocking and/or non-blocking assignments (NBA). In the disclosed interaction mechanism between the simulator and the co-simulators, the handling of the two types of assignments is different, as will be explained further below.

In a blocking assignment (denoted "=" in Verilog, e.g., A=B) the Right-Hand-Side (RHS) of the assignment is evaluated and substituted in the Left-Hand-Side (LHS) of the assignment immediately. Other computations in the given simulation time slot are blocked until the assignment is complete. In a non-blocking assignment (denoted "<=", e.g., A<=B), the RHS of the assignment is evaluated immediately, but the assignment of the result into the LHS is postponed until the other assignments and their resulting assignments in the same time slot are complete. (In the state model of FIG. 3 below, the assignment of results is postponed until the NBA state, the simulator proceeds to either the ACTIVE or the NBA state. When proceeding to the NBA state, the simulator first calls "Pre-NBA" calls (cbNBASync/cbReadWriteSync). Assignment to LHS (in the non-blocking case) is performed in the NBA state.) The other computations are not blocked by the assignment in question and may be carried out. Typically although not necessarily, blocking assignments are used for modeling combinatorial logic, whereas non-blocking assignments are used for modeling sequential logic.

Figure 3:
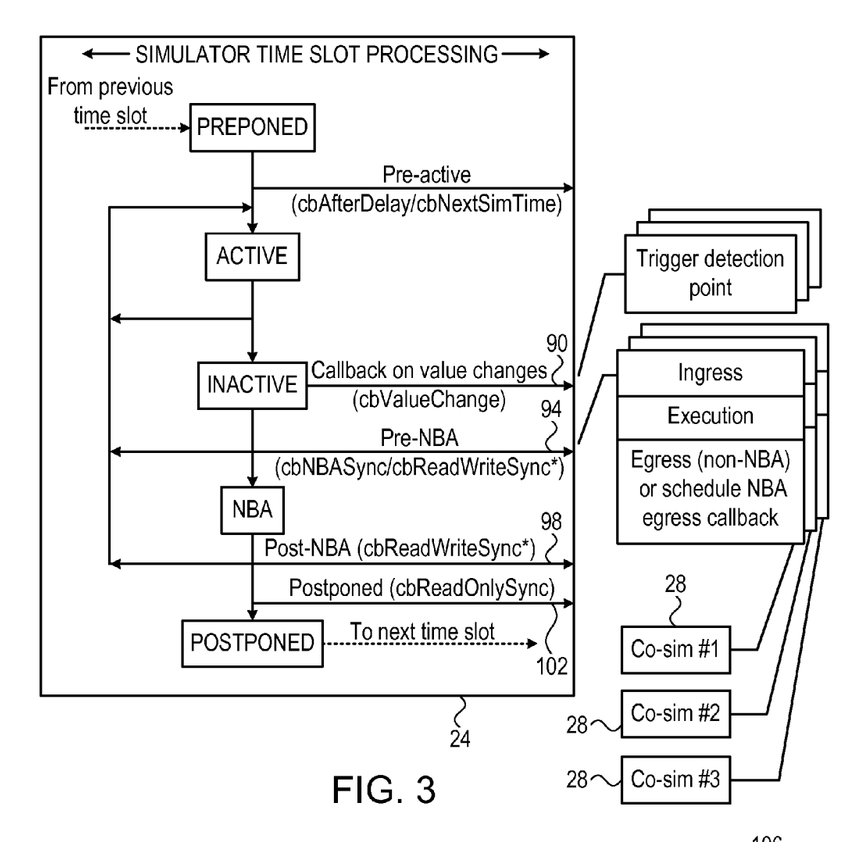
FIGS. 3 and 4 are diagrams that schematically illustrate interaction between a simulator and multiple co-simulators, in accordance with an embodiment of the present invention.

FIG. 3 is a diagram that schematically illustrates interaction between simulator 24 and co-simulators 28, in accordance with an embodiment of the present invention. As can be seen in the figure, the simulator processes each time slot by traversing a sequence of states denoted PREPONED, ACTIVE, INACTIVE, NBA and POSTPONED. The ACTIVE, INACTIVE and NBA states can be traversed multiple times in the same time slot. A detailed description of these states and the processing performed in each state can be found in section 9.3 of the IEEE 1800-2009 standard and in section 5.3 of the IEEE 1364-2001 standard, both cited above.

In the example flow of FIG. 3, simulator 24 provides triggers 90 to co-simulators 28 in the INACTIVE state. Each co-simulator receives triggers corresponding to the signals it has registered with, and whose values have changed. In response to triggers 90, each triggered co-simulator registers on pre-NBA callback, i.e., requests the simulator to trigger it again following the transition from the INACTIVE state to the NBA state. The simulator responds by re-triggering the co-simulators with pre-NBA callback triggers 94.

Note that since the following state carries out the ingress phase, it should be verified that all active and in-active signals were updated before proceeding. The above-described delay mechanism ensures that egress processing is performed only after no assignments are waiting for execution.

In response to triggers 94, each triggered co-simulator carries out the ingress phase, i.e., reads the signal values from the simulator. Each co-simulator then carries out the execution phase, and in particular updates its internal state.

At this point, blocking and non-blocking assignments are handled differently. For each blocking (non-NBA) assignment, the co-simulator carries out the egress phase, i.e., returns the updated signal values to the simulator. For each non-blocking assignment (NBA), the co-simulator schedules the egress phase for a later time following the NBA state of the simulator. The postponed callback cbReadOnlySync is marked by an arrow 102.

Typically, the co-simulator should not perform the egress phase on the cbReadOnlySync callback, but only the ingress phase, i.e., read signals. Another option is to register on cbReadWriteSync. In practice, however, some simulators do not call this callback on Post-NBA (arrow 98). In some embodiments, the egress phase is postponed by causing the simulator to call the co-simulator on "value change event" after NBA state processing is completed. This mechanism is implemented using the signals signal_updated_by_simulator and signal_driven_by_co-simulator. Since the signal signal_updated_by_simulator is updated using "<=", it is updated during the NBA state processing. However, since the co-simulator is registered on this signal (with value_change reason), after NBA state processing the simulator will not continue to the POSTPONED state, but instead go again to the ACTIVE state and will call the co-simulator in the following INACTIVE state.

In some embodiments, for a blocking assignment, the egress phase (returning the result of the assignment from the co-simulator to the simulator) is performed before execution of any non-blocking assignment in the system (including, for example, blocking assignments performed by the simulator, the given co-simulator and the other co-simulators). For a non-blocking assignment, on the other hand, the egress phase is performed after execution of all blocking assignments in the system.

Alternatively to using pre-NBA callback triggers 94, a triggered co-simulator may register on post-NBA callback, i.e., requests the simulator to trigger it again following the NBA state. The simulator in this implementation responds by re-triggering the co-simulators with post-NBA callback triggers 98.

When multiple co-simulators 28 (or other units) communicate with simulator 24 using the above-described mechanism, the signals and databases of all these units will remain synchronized. Each co-simulator carries out its ingress, execution and egress phases. In case of non-blocking assignments, the egress phase has to be performed only after all the co-simulators that were triggered in the same time slot have completed their respective ingress phases. A similar synchronization is also needed between a co-simulator and the simulator (even in the case of a single co-simulator). Although this mechanism was described in the context of multiple co-simulators, it can be used to operate a single co-simulator, as well.

Operating Multiple Co-Simulators without Mutual Blocking

When simulator 24 interacts with multiple co-simulators using the mechanism of FIG. 3, the execution phase of each co-simulator is blocking. If, for example, during the pre-NBA callback to a given co-simulator (arrow 94 in FIG. 3) the co-simulator performs a blocking call (i.e., blocks the process until ingress, execution and egress are completed), the simulator will not be able to call other co-simulators on pre-NBA. As a result, the other co-simulators will not perform their execution concurrently with the given co-simulator. Instead, each co-simulator will perform its ingress, execution and egress only after the previous co-simulation completes.

The mechanism described below enables concurrent running of the execution phase. When using this mechanism, each co-simulator returns control to the simulator after it completes its ingress phase and initiates the execution phase (execution is assumed to be non-blocking).

In some embodiments, a given co-simulator returns control to the simulator even though it has not yet completed its execution and egress phases, in order to allow other co-simulators to proceed. If the co-simulator did not complete its execution and egress phases by the time control is returned to the simulator, the co-simulator schedules the simulator to call it again at a later time to update the egress phase results. An example process of this sort is shown in FIG. 4.

Figure 4:
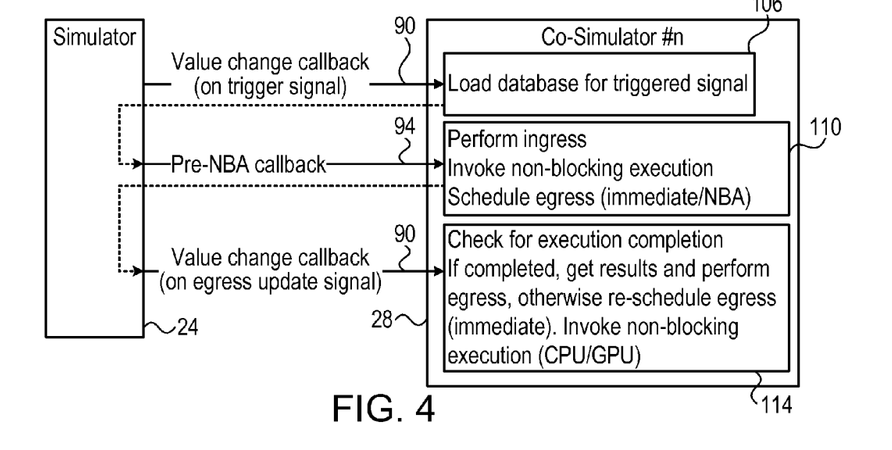

FIG. 4 is a diagram that schematically illustrates interaction between a simulator and multiple co-simulators, in accordance with an embodiment of the present invention. The process of FIG. 4 begins with simulator 24 triggering a given co-simulator 28 with trigger 90 (callback on value change). In response, the co-simulator loads the respective database of the triggered signal, at a loading step 106. The database typically indicates the subsequent steps, e.g., ingress, execution, egress (NBA/Non-NBA). The co-simulator registers for a Pre-NBA callback. As a result, the simulator calls this callback only after all ACTIVE and INACTIVE events and before NBA.

When pre-NBA trigger callback trigger 94 arrives, the co-simulator performs the ingress phase, invokes execution of non-blocking assignments, and schedules postponed egress processing, at a processing step 110.

In the next value change callback trigger 90, the co-simulator carries out a completion checking step 114. In this step, the co-simulator checks whether the execution phase is completed. If completed, the co-simulator obtains the execution results and performs the egress phase. Otherwise, the co-simulator re-schedules egress for blocking assignments.

Using this technique, execution in one co-simulator does not block other co-simulators. As a result, the co-simulators can carry out their respective sub-tasks concurrently and thus reduce simulation time. When co-simulation execution is performed by CPU 44 and not GPU 48, concurrency can be supported using multiple concurrent threads or processes.

In some embodiments, system 20 schedules blocking and non-blocking execution using the following scheme:

Two Verilog signals denoted "signal_driven by_co_simulator" and "signal_updated_by_simulator" are defined (typically in one of the Verilog files that are compiled by the simulator).

The co-simulator registers for callback on value change for the signal signal_updated_by_simulator.

The following code is added (typically in one of Verilog files that are compiled by the simulator):
a. For immediate (blocking) update:
always@(signal_driven_by_co_simulator)
signal_updated_by_simulator=signal_driven_by_co_simulator
b. For NBA update:
always@(signal_driven_by_co_simulator)
signal_updated_by_simulator <=signal_driven_by_co_simulator Whenever the co-simulator prepares to schedule a callback, it reads the signal_driven_by_co_simulator signal from the simulator via VPI, increments the signal value by one, and writes back the incremented value to the simulator via VPI. Since the simulator implements the update of signal_updated_by_simulator as described above, the simulator will call the co-simulator (with VPI value change reason).

Partitioning of Simulation Tasks into Sub-Tasks

A given simulation task (e.g., VLSI design to be verified) can be partitioned into sub-tasks in various ways. In some embodiments, partitioning is carried out by a process that precedes simulator 24. This process generates products that are later used by the simulator. The partitioning may be performed by the same computing platform that runs simulator 24. Alternatively, partitioning may be carried out by another processor or system external to system 20, in which case the design may be provided to simulator 24 in partitioned form. The following description provides an example partitioning process. The description refers to partitioning that is performed by a processor, regardless of the actual computing platform that runs it.

In this example embodiment, the processor splits a simulation task that is represented by a hierarchical tree structure (e.g., tree 50 of FIG. 2 above). The processor splits the task into multiple (e.g., several tens of) partitions. Each partition comprises a certain node in the hierarchical tree and the nodes below it. The root node of each partition has a parent node that is not accelerated, i.e., that is executed by the simulator and not assigned to any co-simulator. Synchronization between partitions is performed via the simulator. Communication between partitions may be carried out directly or via the simulator.

The user provides two parameters denoted MIN_SPLIT_WEIGHT_SIZE and MAX_SPLIT_WEIGHT_SIZE. MIN_SPLIT_WEIGHT_SIZE specifies the minimum permitted weight of a partition. MAX_SPLIT_WEIGHT_SIZE specifies the maximum weight of a partition. In some cases a partition larger than MAX_SPLIT_WEIGHT_SIZE may be created, but only if it is not possible to split this partition into splits larger than MIN_SPLIT_WEIGHT_SIZE, such that they cover at least a certain percentage (denoted P1) of that split weight.

The weight of a partition can be defined in various ways. In some embodiments, the weight of a tree node is defined as the number of tree nodes at and below the node in question. The weight of a partition in these embodiments is defined as the weight of the node that serves as the root of the partition. In other embodiments, e.g., in RTL designs, the weight of a node may also depend on the number of statements and/or constructs in the node and the nodes below it. Again, the weight of a partition is defined as the weight of the node that serves as the partition root. In some embodiments, the processor runs a recursive process that calculates the weight of each tree node.

In an example embodiment, the partitioning is performed by the following recursive function that takes the current node (cur_node) as argument:

```
Cur_weight = weight of the cur_node
Is_nacc = this module is non-accelerated
Is_top = this node was specified by the user as a
    Device-Under-Test (DUT) top level
sum the weights that are > MIN_SPLIT_WEIGHT_SIZE
    of the children of cur_node into
    sum_weights_in_range
if (cur_weight > MAX_SPLIT_WEIGHT_SIZE and
    sum_weights_in_range > P1*cur_weight) or
    is_nacc:
        call auto-split for all of the children,
        and OR together the returned Booleans into
        OR_result
if (cur_weight < MAX_SPLIT_WEIGHT_SIZE or
    ~OR_result) and !is_nacc and
    (cur_weight>SPLIT_MIN_WEIGHT_SIZE       or
    is_top):
        add this node as a split-root
        return True
return OR_result
```

When using this recursive function, the next level of hierarchy is inspected if:

The current node is "too heavy," i.e., its weight is too high; and

The weights of the children of the current node (that are > MIN_SPLIT_WEIGHT_SIZE) sum into a value that covers at least P1% of the current node weight.

Therefore, it is permitted to exceed MAX_SPLIT_WEIGHT_SIZE in case that the children (that can become partitions) cannot cover the weight. Parameter MAX_SPLIT_WEIGHT_SIZE is therefore a "soft" constraint that is exceeded in some cases, while MIN_SPLIT_WEIGHT_SIZE is a hard constraint. In the above description, P1 is a user-definable parameter. In one example embodiment P1=90%, although any other suitable parameter values can be used.

In alternative embodiments, any other suitable partitioning process can be used. In some embodiments, the partitioned simulation task is compiled using multiple compilers, such that each compiler compiles a respective subset comprising one or more of the sub-tasks. Different compilers may run on different processors or other computing platforms, which in some embodiments operate in parallel to one another.

Although the embodiments described herein mainly address design verification applications, the methods and systems described herein can also be used in other applications. For example, the above-described partitioning process can be used in other Electronic Design Automation (EDA) applications such as Place&Route applications. Another example application is in concurrent searching using multiple concurrent search engines.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method of simulating a VLSI design in a simulator that controls multiple co-simulators, the method comprising:
   accepting a simulation task, which includes execution of a VLSI design comprising a hierarchical tree structure partitioned into a plurality of multi-node partitions, over a sequence of a plurality of time slots;
   assigning each of the co-simulators such that a root node of each partition has a parent node that is not assigned to any of the co-simulators to simulate a respective subset of the partitions; and
   executing the simulation task by invoking each co-simulator to execute, for each partition and for each time slot of the plurality of simulation time slots:
      receiving values of input signals of the partition from the simulator; and
      simulating the partition based on the input signals and a respective database of internal signals which includes an internal state of signals of the partition managed continuously and updated over the sequence of time slots but not shared with the simulator, and
      providing, to the simulator, signals from the simulation which are required for simulation of other partitions, but not the states of the internal signals such that the simulator does not have full state information with respect to co-simulation states.

2. The method according to claim 1, wherein executing the simulation task comprises:
   executing a given sub-task, which comprises a value assignment statement, by a given co-simulator;
   if the value assignment statement is a blocking assignment, returning a result of the value assignment statement from the given co-simulator to the simulator before execution of any non-blocking assignment; and
   if the value assignment statement is a non-blocking assignment, returning the result after executing all blocking assignments.

3. The method according to claim 2, wherein returning the result comprises scheduling the simulator to call the given co-simulator at a postponed time in order to accept the result of the value assignment statement.

4. The method according to claim 1, and comprising returning control of the simulation task from a given co-simulator to the simulator before completing execution of a given sub-task executed by the given co-simulator, in order to enable at least one other co-simulator to operate concurrently with the given co-simulator.

5. The method according to claim 4, wherein returning the control comprises scheduling the simulator to call the given co-simulator at a postponed time in order to accept a result of the given sub-task.

6. The method according to claim 1, wherein executing the simulation task comprises simulating at least one partition of the simulation task by the simulator.

7. The method according to claim 1, wherein the VLSI design comprises a hierarchical tree structure, and wherein partitioning the VLSI design is performed by recursively traversing the hierarchical tree structure.

8. The method according to claim 1, wherein accepting the simulation task comprises accepting a definition of a hardware design, and wherein executing the simulation task comprises verifying the hardware design.

9. The method according to claim 1, wherein the VLSI design is paritioned into multi-node partitions which are each small enough to be handled by a Graphics Processing Unit (GPU).

10. The method of claim 1, wherein executing the simulation task comprises performing for each time slot:
an ingress phase, in which the co-simulator verifies synchronization of the one or more signals which are kept synchronized with the simulator,
an execution phase in which the co-simulator updates its internal state, and
an egress phase in which the co-simulator updates the simulator with current values of one or more signals which are kept synchronized with the simulator.

11. The method of claim 10, wherein in the ingress phase, the co-simulator updates internal values of any of the one or more signals which are kept synchronized with the simulator, whose values changed in the simulator.

12. The method of claim 1, wherein each co-simulator has a separate memory in which the databases of its sub-tasks are stored.

13. The method of claim 1, wherein the simulation task of the VLSI design is divided into several tens of partitions.

14. A system, comprising:
multiple co-simulators; and
a simulator, which is configured to accept a simulation task that includes execution of a VLSI design comprising a hierarchical tree structure partitioned into a plurality of multi-node partitions, over a sequence of a plurality of time slots, to assign each of the co-simulators such that a root node of each partition has a parent node that is not assigned to any of the co-simulators to simulate a respective subset of the partitions, and to execute the simulation task by invoking each co-simulator to execute , for each partition and for each time slot of the simulation time slots:
receiving values of input signals of the partition from the simulator; and
simulating the partition based on the input signals and a respective database of internal signals which includes an internal state of signals of the partition managed continuously and updated over the sequence of time slots but not shared with the simulator, and providing, to the simulator, signals from the simulation which are required for simulation of other partitions, but not the states of the internal signals, such that the simulator does not have full state information with respect to co-simulation states.

15. The system according to claim 14, wherein a given co-simulator is configured to execute a given sub-task that comprises a value assignment statement, to return a result of the of the value assignment statement to the simulator before execution of any non-blocking assignment if the value assignment statement is a blocking assignment, and to return the result after executing all blocking assignments if the value assignment statement is a non-blocking assignment.

16. The system according to claim 15, wherein the given co-simulator is configured to schedule the simulator to call the given co-simulator at a postponed time in order to accept the result of the value assignment statement.

17. The system according to claim 14, wherein a given co-simulator is configured to return control of the simulation task to the simulator before completing execution of a given sub-task executed by the given co-simulator, in order to enable at least one other co-simulator to operate concurrently with the given co-simulator.

18. The system according to claim 17, wherein, upon returning the control, the given co-simulator is configured to schedule the simulator to call the given co-simulator at a postponed time in order to accept a result of the given sub-task.

19. The system according to claim 14, wherein the simulator is configured to simulate at least one partition of the simulation task.

20. The system according to claim 14, and comprising a processor that is configured to represent the VLSI-design as a hierarchical tree structure, and to partition the VLSI-design by recursively traversing the hierarchical tree structure.

21. The system according to claim 14, wherein the simulation task comprises a definition of a hardware design, and wherein the simulator is configured to execute the simulation task by verifying the hardware design.

22. The system according to claim 14, wherein the VLSI design is paritioned into multi-node partitions which are each small enough to be handled by a Graphics Processing Unit (GPU).

23. A computer software product, the product comprising a tangible non-transitory computer-readable medium, in which program instructions are stored, which instructions, when read by a computer, cause the computer to perform steps of:
accepting a simulation task that includes execution of a VLSI design comprising a hierarchical tree structure partitioned into a plurality of multi-node partitions, over a sequence of a plurality of time slots, to assign each of multiple co-simulators such that a root node of each partition has a parent node that is not assigned to any of the co-simulators to simulate a respective subset of the partitions, and to execute the simulation task by invoking each co-simulator to execute, for each partition and for each time slot of the simulation time slots;
receiving values of input signals of the partition from the simulator; and
simulating the partition based on the input signals and a respective database of internal signals which includes an internal state of signals of the partition managed continuously and updated over the sequence of time slots but not shared with the simulator, and providing, to the simulator, signals from the simulation which are required for simulation of other partitions, but not the states of the internal signals, such that the simulator does not have full state information with respect to co-simulation states.

* * * * *